United States Patent [19]
Golin et al.

[11] Patent Number: 5,694,531
[45] Date of Patent: Dec. 2, 1997

[54] METHOD AND APPARATUS FOR SIMULATING MOVEMENT IN MULTIDIMENSIONAL SPACE WITH POLYGONAL PROJECTIONS

[75] Inventors: Stuart J. Golin, East Windsor, N.J.; Jonathan A. Eggert, Tigard, Oreg.

[73] Assignee: Infinite Pictures, Portland, Oreg.

[21] Appl. No.: 552,299

[22] Filed: Nov. 2, 1995

[51] Int. Cl.$^6$ ................................................. G06F 15/00
[52] U.S. Cl. ................................................................. 395/119
[58] Field of Search .................................. 395/118, 100, 395/119, 125, 127; 345/139

[56] References Cited

U.S. PATENT DOCUMENTS

| | | | |
|---|---|---|---|
| 4,807,158 | 2/1989 | Blanton et al. | 364/521 |
| 5,103,217 | 4/1992 | Cawley | 395/129 |
| 5,185,667 | 2/1993 | Zimmermann | 358/209 |
| 5,313,306 | 5/1994 | Kuban et al. | 348/65 |
| 5,359,363 | 10/1994 | Kuban et al. | 348/36 |
| 5,384,588 | 1/1995 | Martin et al. | 348/15 |
| 5,396,583 | 3/1995 | Chen et al. | 395/127 |
| 5,446,833 | 8/1995 | Miller et al. | 395/125 |

OTHER PUBLICATIONS

Foley J.D., van Dam A., Feiner, S.K., Hughes, J.F., *Computer Graphics: principles and practice*, 2nd ed., Addison-h-Wesley, 1987, pp. 3-7.

McMillan L. and Bishop, G., *Plenoptic Modeling: An Image-based Rendering System*, Siggraph 1995 Proceedings, 195, pp. 39-46.

Chen, S. E., Williams, Lance, Apple Computer, Inc., View Interpolation for Image Synthesis, *Computer Graphisc Proceedings*, Annual Conference Series, 1993, pp. 279-288.

*Primary Examiner*—Phu K. Nguyen
*Attorney, Agent, or Firm*—Marger, Johnson McCollom & Stolowitz, P.C.

[57] ABSTRACT

A method and apparatus for generating views of an environment with proper perspective and parallax. This invention captures panoramic views at many points in the environment and stores them as planar polygons, which have been extended to include imagery occluded at their viewing position but visible at nearby points. Three-dimensional information on the environmental source of these polygons is determined and stored, enabling the playback system to simulate parallax as well as to produce stereographic images. Given a location and orientation in the environment, the playback system finds a nearby capture point and translates the polygons at that point to the specified location, producing an image. It then rotates that image to the desired orientation which it then displays.

23 Claims, 4 Drawing Sheets

METHOD AND APPARATUS FOR SIMULATING MOVEMENT IN MULTIDIMENSIONAL SPACE WITH POLYGONAL PROJECTIONS

BACKGROUND OF THE INVENTION

A. Field of the Invention

This invention relates generally to digital image processing and computer graphics. More particularly, it is concerned with simulating free movement within a multidimensional environment, which can be either computer-generated or real.

B. Description of the Related Art

Computer-generated (CG) environments are typically created by representing objects with polygons and associated computer-generated or photographic surfaces, or texture maps. Rendering, the construction of an image from a CG model, can be done from any point of view. See Foley [J. D. Foley, A. van Dam, S. K. Feiner, J. F. Hughes, *Computer Graphics: principles and practice*, 2nd ed., Addison-Wesley, 1987]. As such, it provides unrestricted simulated movement within the environment. However, the temporal resolution of unrestricted movement within a realistic CG environment that one can achieve on today's personal computers is severely limited by the computational requirements and by the labor of constructing realistic imagery.

U.S. Pat. No. 4,807,158 to Blanton, et. al discloses a method for reducing the computational requirements of rendering CG images, which could also be applied to natural images. First they build a database of images at selected positions, or "keypoints", within the environment by rendering them in an off-line process. They store these panoramic images as conic projections. Then in real time, the application approximates the image at any position from that at the nearest keypoint. This approach works well when all objects are about the same distance from the viewer. This is a good assumption in their application, a flight simulator, but the loss of parallax would be a severe limitation in many environments. Objects at different distances move as a unit within the domain of a keypoint, and parallax is only evident when the keypoint changes.

U.S. Pat. No. 5,396,583 to Chen, et. al captures panoramas and project them onto cylindrical surfaces for storage. They are able to rapidly project images from a cylinder to a plane using "scanline coherence". Unfortunately, like Blanton, their method does support parallax.

McMillan, et. al. [L. McMillan and G. Bishop, Plenoptic Modeling: *An Image-Based Rendering System*, Siggraph '95 Proceedings, 1995], report a method that supports parallax, and apply it to natural images. They also produce a series of reference images off-line, which are captured with a video camera and re-projected to cylinders for storage. To support parallax, they calculate the image flow field between adjacent reference images. Now, when an image is approximated from a nearby reference image, different parts will move differently. Unfortunately, artifacts are quite apparent unless the image flow field is extremely accurate. Occluded regions cause additional artifacts.

The cylindrical surface (Chen and McMillan) is very inefficient for storing panoramic imagery near the vertical.

Accordingly, the need remains for an improved method for simulating free movement within a multidimensional environment.

SUMMARY OF THE INVENTION

It is the object of this invention to simulate movement in a multidimensional space by approximating views at any viewpoint and orientation, with correct perspective and parallax. An additional object of this invention is to support stereography. It is a further object of this invention to provide an efficient method for storing panoramic imagery, especially for orientations near the vertical.

This invention captures panoramic views at many keypoints in the environment, preferably using fisheye photography. It stores these views as projections, from which one can produce views at any position and orientation.

In the preferred embodiment, the projections are planar, and consist of polygons that are projections of areas in the environment that are approximately planar. The locations of these areas are stored, giving the playback system the three-dimensional information necessary to infer how the individual polygons move with the viewpoint, and thus simulate parallax.

Because it simulates parallax, the invention can produce stereographic images.

The preferred embodiment solves the occlusion problem in a novel way. Imagery that is occluded at a keypoint but visible at a nearby viewpoint is added to that keypoint, either by extending existing polygons or by creating new ones.

DETAILED DESCRIPTION OF THE INVENTION

Figure 1:
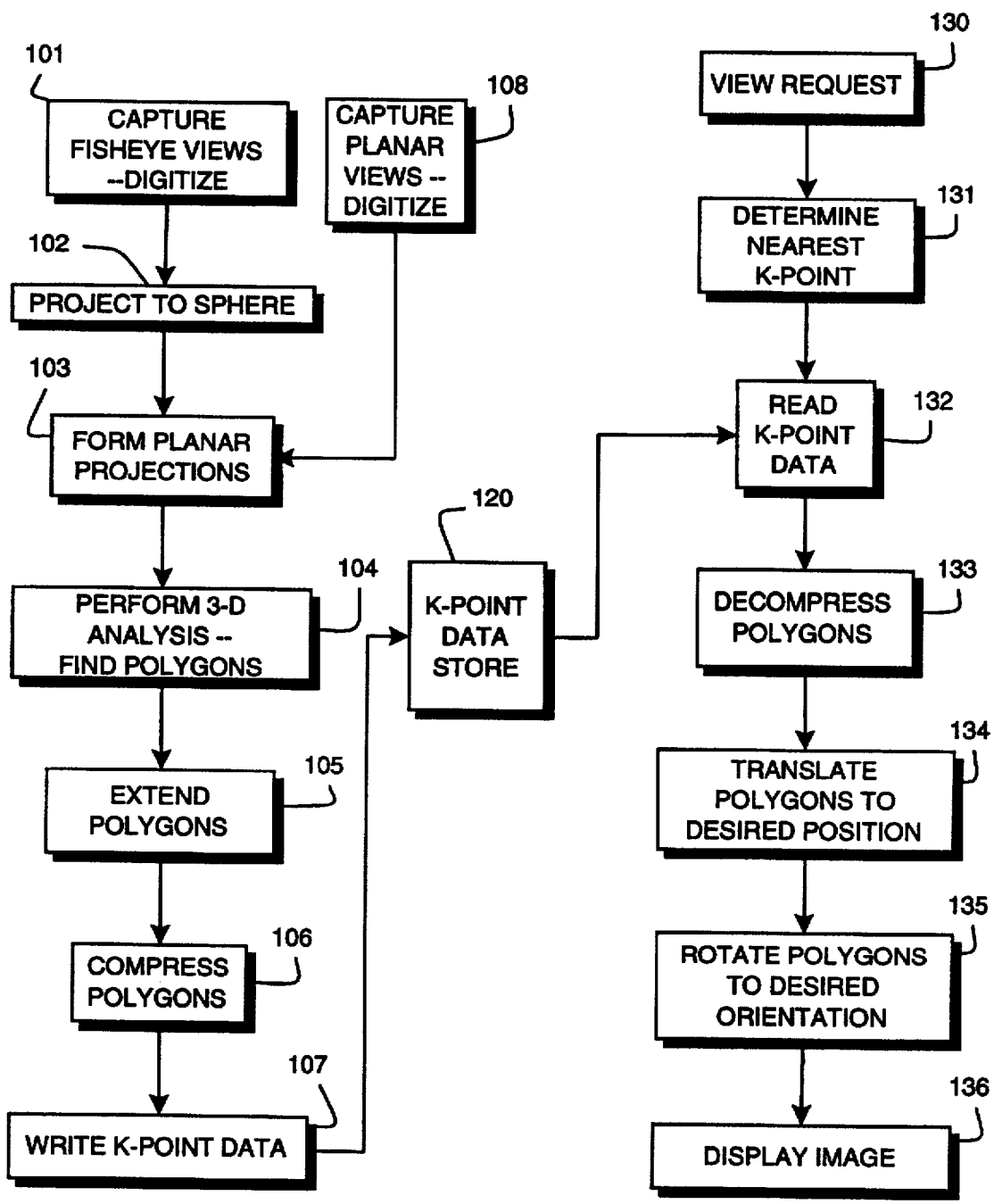
FIG. 1 is a flow chart illustrating an overview of the invention.

FIG. 1 shows the overall operation of the invention. Images are captured either by a fisheye 101 or planar camera 108, and are used to form planar projections 103 at keypoints; fisheye images are first projected to a sphere 102. An analysis 104 is performed to segment these images into polygons that are the projections of approximately planar areas in the environment. These polygons are extended 105 with occluded imagery and then compressed 106. The compressed polygons, together with three-dimensional and other information, are written 107 to computer-readable storage 120.

The playback system, on receiving a view request 130 specifying a position and orientation in the environment, determines the nearest keypoint 131 and reads 132 the relevant data from storage 120. It decompresses 133 the polygons at that keypoint, translates 134 them to the desired position, rotates 135 them to the desired orientation, and displays 136 the resulting image.

Figure 2:
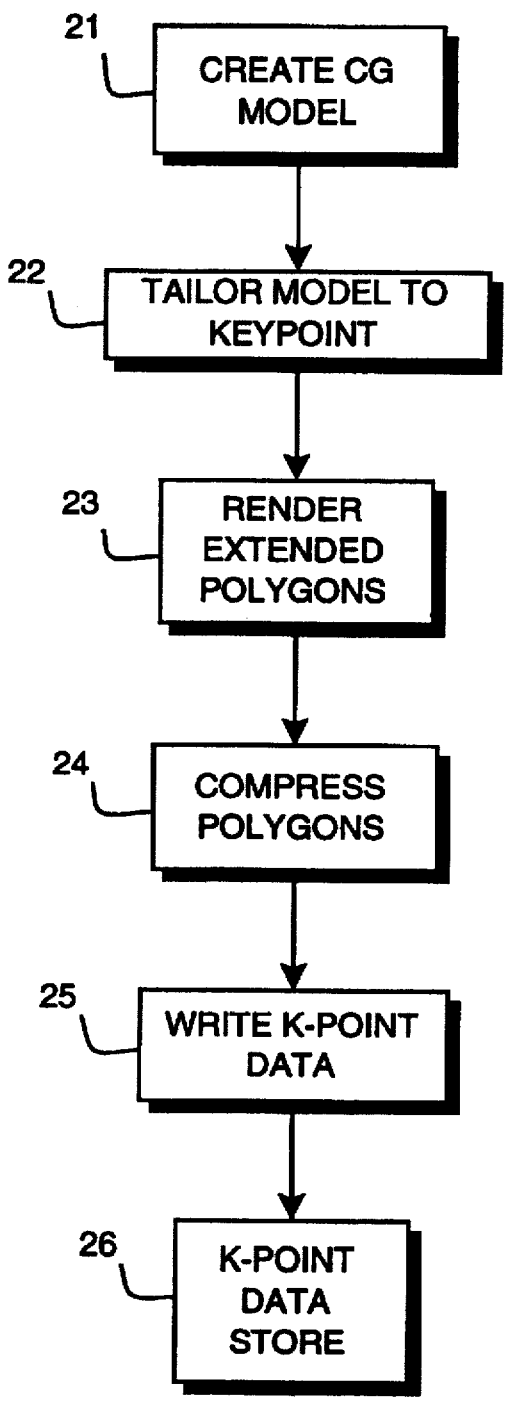
FIG. 2 is a flow chart illustrating an overview of the off-line processing of the invention for a CG model that takes advantage of access to that model.

CG environments can be handled exactly as in FIG. 1, except that the views are rendered from the model rather than being captured. However, if one has access to the internals of the model, then one can simplify the analysis, and even eliminate off-line processing. FIG. 2 shows the off-line processing that takes advantage of the model. After the model is created 21, this processing tailors the model 22 for the keypoint by eliminating detail that is too fine to be realized at that keypoint. It then extends and renders 23 and compresses 24 the polygons, and writes the k-point data 25 to computer-readable storage 26.

Figure 3:
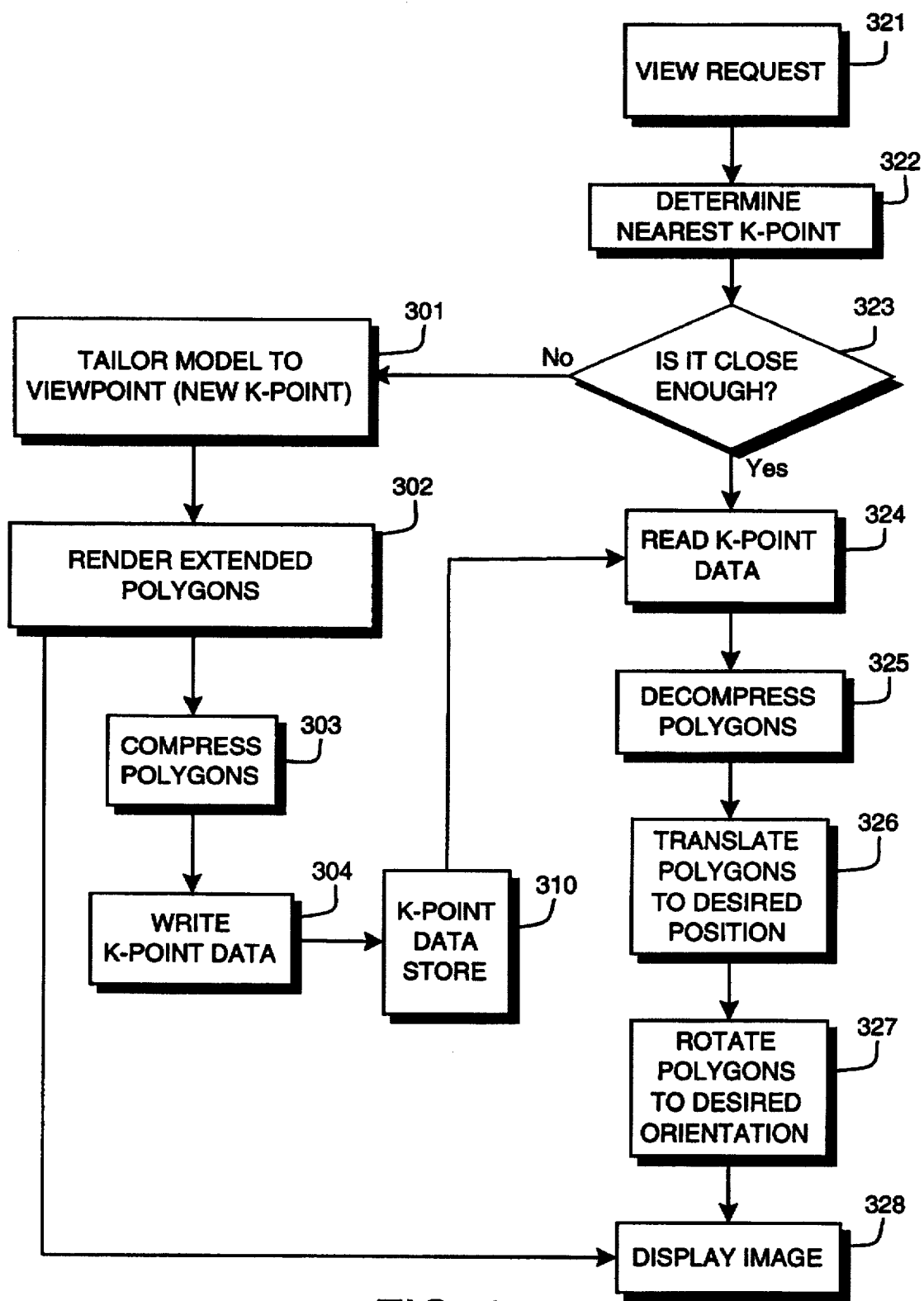
FIG. 3 is a flow chart illustrating how the invention can be used to eliminate off-line processing for a CG model.

FIG. 3 shows a self-contained playback system, one that does not require off-line processing. It is similar to the playback system in FIG. 1, except that it generates keypoint data as needed. It does this using the methods illustrated in FIG. 2. In particular, on receiving a view request 321, it determines the nearest k-point 322. If this k-point is close enough 323 to the viewpoint, it reads the k-point data 324 from computer-readable storage 310, decompresses the polygons 325, translates the polygons to the desired position 326, rotates them to the desired orientation 327, and displays the resulting image 328. If it is determined 323 that no k-point is sufficiently close to the viewpoint, then the CG model is tailored to the viewpoint 301, to make it a new k-point. It then extends and renders the polygons 302, compresses them 303, and writes the k-point data 304 to computer-readable storage 310.

Figure 4:
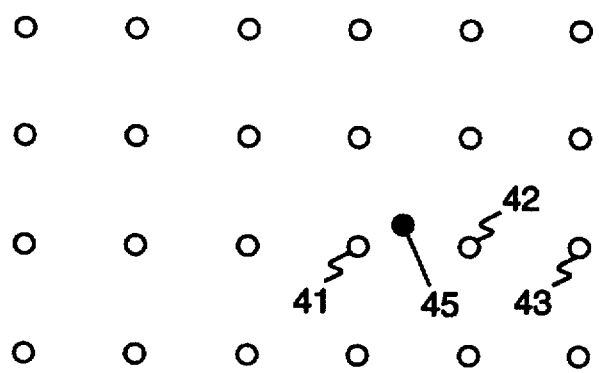
FIG. 4 shows a two dimensional arrangement of keypoints (open circles) with a potential viewpoint (closed circle).

FIG. 4 shows a possible two-dimensional environment with open circles 41, 42, 43 representing keypoints, and a closed circle 45 representing a viewpoint. The view at the viewpoint 45 is preferably based on that of the nearest keypoint 41.

The invention consists of the panoramic database, its creation, and its use to map images to arbitrary positions and orientations.

A. Notation

CG, or Computer Graphics, refers to artificial environments.

A projection of the environment is specified by an orientation, or axis of projection, a projection surface normal to that axis, and by the center of projection. The center of projection, or point of view, is the viewpoint; it corresponds to the nodal point of a camera. Unless otherwise specified, the projection surface is planar. Other possibilities include cylindrical, conic, spherical, and fisheye projections. The distance from the center of projection to the plane of projection is the focal length, and is measured in pixels.

Polygons, unless otherwise qualified, are projections of approximately planar areas of the environment. These planar approximations are also polygonal, and are called e-polygons (e is for environment). The e-polygons form a "wire-frame model", and the polygons form the "texture maps". In contrast to conventional CG modeling, however, the environment description is redundant, with multiple e-polygons and polygons instead of one.

Images are projections that are large enough to fill a display. Images may be segmented into polygons.

Projections may be produced directly from the environment or from a CG model, or they may be approximated from previously calculated k-projections (key projections) by a mapping process. The viewpoints of the k-projections are called k-points (keypoints). A k-polygon is a k-projection that is a polygon, and a k-image is a k-projection that is an image. We will sometimes omit the "k-" prefix when the context makes it obvious.

The domain of a k-point is the range of viewpoints and orientations to which its projections can be mapped. The domain of a k-projection is that of its k-point. K-polygons with occluded areas may be extended to support their domains. The domain of a k-point is supported when its k-polygons contain all of the imagery needed to map to any viewpoint in that domain.

Domains can overlap. Non-overlapping domains of k-points can be constructed as Voronoi regions, also known as Dirichlet and nearest neighbor regions, or in other ways.

The mapper produces an image that can be displayed, and is part of the playback system.

B. Description of the panoramic database

The database, which is in a computer-readable storage medium, consists of a set of k-projections, together with their k-points, predetermined key orientations, domains, and other information useful for the creation of views of the environment. All of the data associated with a k-point is collectively referred to as k-point data. The k-projections may be uncompressed, or may be compressed with any of a variety of techniques, such as MPEG or JPEG. For CG environments, the k-projections that are rendered at a k-point might be compressed using a graphic representation. (This is less compression than one could achieve by simply storing the original CG model, but it leads to faster playback.)

The k-points may be arranged on a two or three dimensional lattice, may be concentrated in areas of high detail, or may follow some other arrangement.

In the preferred embodiment, the projections are all planar. However, alternate embodiments use cylindrical, conic, spherical, or fisheye projections. One embodiment uses a cylindrical projection for the "equatorial" region and conic projections for the "poles"; the mathematics for these projections is described by Blanton and McMillan.

There are many different ways to store the k-projections as planar projections at a k-point. In the preferred embodiment, one stores a large number of k-polygons at various orientations. In an alternate embodiment, one stores one or more k-images at various orientations. The way this is done will depend on the needs of the application, such as the importance of the "polar regions". As few as four k-images, arranged tetrahedrally, provide a full panorama. However, the more k-images, the fewer the total number of pixels. An obvious arrangement consists of six k-images around the equator (horizon), three to six k-images about 60° above the equator, and three to six below. Another possibility is four k-images about 45° above the equator, and four below.

There is a useful advantage in storing the panorama as planar images, as opposed to, say, cylindrical ones: the images at the k-points can be directly displayed without mapping. When one moves rapidly through the environment, it may be sufficient to display an existing image that has approximately the correct view point and orientation. This benefit is somewhat reduced when the k-projections are similarly oriented polygons rather than images, and reduced more if their orientations are independent.

When the k-projections are stored as k-images, then these images are completely segmented into non-overlapping polygons. Whether the polygons are stored as units or as subunits of an image, each polygon represents the projection of an area of the environment that is approximately planar. The planar approximation of this area is also polygonal, and is known as an e-polygon. The database records the planar equation of each e-polygon. (Alternately, one can specify the coordinates of its vertices, or calculate them from the planar equation, the coordinates of the vertices of the k-polygon, and Eq. 5 and Eq. 10 below.) This permits the mapper to translate the polygon to another viewpoint in its domain.

It is desirable for storage and computational efficiency that the k-polygons and their corresponding e-polygons be large and few in number. However, the larger they are, the worse the planar approximation becomes, and the larger will be the parallax distortion when a polygon is mapped to a viewpoint in its domain. This distortion limits their sizes. This implies that an area of the environment represented by a single e-polygon (and a single k-polygon) at a distant k-point will likely be represented by multiple e-polygons at one nearby.

The e-polygons form a three-dimensional model for a k-point and its domain. In the preferred embodiment only one k-polygon is stored for each e-polygon. The k-polygon can be formed as a projection of the e-polygon at any orientation; a convenient orientation is the one pointing to the center of gravity of the e-polygon. In an alternate embodiment, an e-polygon is represented by k-polygons at several orientations to minimize the magnitude of the scale changes and shearing of a mapping, and thus to minimize aliasing.

In the preferred embodiment, the polygons of a k-point are extended to include parts of the environment that are occluded at that k-point but are visible at some point in their domain. (The k-projections cannot be stored as k-images in this embodiment because the extended polygons would overlap if placed in a single plane.) Without this embodiment, the mapper must use k-projections at more than one k-point to map the occluded areas.

In an alternate embodiment, the k-polygons are replaced by curved areas that more naturally represent the environment.

To minimize the complexity of mapping, the polygons (or curved areas) at each k-point are described in "list-priority" order. They are split as necessary to preserve this order over their domain, as described by Foley in chapter 15.

C. Preparation of the panoramic database for CG environments

One can calculate the k-projections for CG environments using the standard graphics rendering techniques described by Foley. However, clipping will be disabled, or at least relaxed, in order to extend the polygons to support their domain. Similarly, the e-polygons follow directly from the CG model. This assumes that the embodiment of the invention has access to the CG model, and that it can control the rendering of that model. Otherwise, some of the techniques described below for natural environments will be needed here.

CG models tend to use a large number of e-polygons. These e-polygons are important for mapping images at nearby viewpoints, but their numbers are excessive for distant viewpoints. For those viewpoints, it is necessary to consolidate e-polygons; a good criterion is to consolidate when the resulting parallax error is below a predetermined limit, preferably 1 pixel. However, merging continues at least until the number of e-polygons is reduced to a predetermined limit.

In the preferred embodiment the database is built off-line, as shown if FIG. 2. In an alternate embodiment, projections are rendered from the CG model as needed, as shown if FIG. 3. The viewer-selected viewpoints, or a subset of them, become k-points. This alternate embodiment reduces bandwidth and/or storage requirements, and is important when it is not practical to pre-calculate the database, or to transmit it dynamically. Suppose, for example, a game player enters a new environment. Because some delay can be expected in this case, it may be acceptable to render the first several projections dynamically. These projections and associated information are saved as k-point data. As the number of k-points increases, it will become increasingly likely that one can map k-projections from existing ones, and response will improve.

D. Preparation of the panoramic database for natural environments

1. Construction of k-projections

There are various ways to construct panoramic views. One embodiment combines the projections from a video camera (McMillan). The preferred embodiment uses a camera with a fisheye lens. A single fisheye camera, pointed forward, will capture about half of the panorama at a k-point, which will be adequate for some applications, and two may provide a full panorama. The preferred embodiment uses three horizontal fisheye projections with 120° between their axes, which provide a full panorama with ample overlap to minimize boundary artifacts. An alternate embodiment uses a single fisheye projection pointed upward; a 220° lens can capture everything except for imagery about 20° or more below the horizon.

Conceptually, one produces planar projections from the fisheye image by using a spherical projection as an intermediary. The mapping to a sphere can be understood from FIG. 5, which represents both the fisheye image and the sphere, with slightly different interpretations. Subscripts will distinguish these cases: f for the fisheye and s for the sphere. The point to be mapped, p, is represented by h, its distance to the origin, O, and θ, the angle from the vertical. H is the maximum value of h.

$H_f$ is the radius of the fisheye image. The units of $h_f$ and $H_f$ are pixels.

Figure 5:
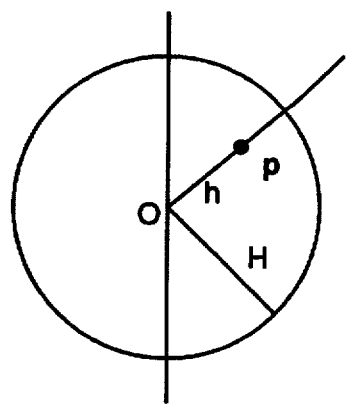
FIG. 5 represents both a fisheye projection and a spherical projection of that fisheye projection.

For the sphere, the view in FIG. 5 is along the axis of the camera, with the viewpoint, or center of projection, at the center of the sphere. The origin, O, is at the intersection of the axis and the surface of the sphere; it is NOT the center of the sphere. h. is the angle of the arc of the great circle between $O_s$ and $p_s$, and $H_s$ is the maximum angle of view, measured from $O_s$. For example, for a 180° lens, $H_s=90°=\pi/2$. $\theta_s$ is the dihedral angle between 2 axial planes, one through the vertical and one through $p_s$.

The mapping to the sphere is simply (see, e.g., R. Kingslake, *Optical System Design*, p. 87, Academic Press, 1983, for a discussion of the fisheye):

$$\theta_s = \theta_f \qquad \text{Eq. 1}$$
$$h_s/H_s = h_f/H_f$$

Figure 6:
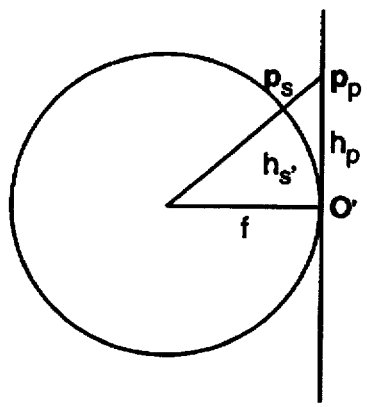
FIG. 6 illustrates the projection from a sphere to a plane.

One can readily project from a sphere to a plane at any orientation. FIG. 6 shows a plane in cross section tangent to the sphere at point O', which specified the orientation. For any point in the plane, one finds the corresponding point in the sphere by extending the radial line from the sphere to the plane. Then, with f being the focal length and ($h_p$, $\theta_p$) being the polar coordinates of a point in the plane (see FIG. 5), the point on the sphere is:

$$h_s' = \tan^{-1}(h_p/f) \qquad \text{Eq. 2}$$
$$\theta_s' = \theta_p$$

Figure 7:
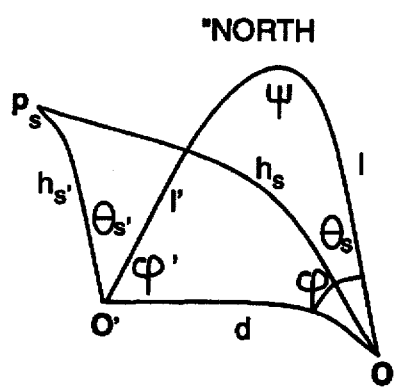
FIG. 7 shows the relevant parameters in converting origins of a sphere.

It is desirable to express this in terms of ($h_s$, $\theta_s$) so that Eq. 1 can be used to get the fisheye coordinates. FIG. 7 shows the quantities used to express the conversion, where all of the curves are arcs of great circles, and the lengths are measured as angles. The "North Pole" defines the vertical, and l and l' are the compliments of the "latitudes" of O and O', respectively. φ is the azimuth angle between O and O'.

From l, l', and φ, which are independent of p and are assumed known, we find the intermediate quantities: Φ, Φ', and d from spherical trigonometry:

$$cos d = cos l cos l' + sin l sin l' cos\phi$$
$$sin\phi'/sin l = sin\phi/sin l' = sin\phi/sin d$$  Eq. 3

Then:
$$cos h_s = cos h_s' cos d + sin h_s' sin d cos(\phi' + \theta_s')$$  Eq. 4
$$sin(\phi - \theta_s) = sin(\phi' + \theta_s') sin h_s'/sin h_s$$

Note when $h_s = 0$, that $\theta_s$ is irrelevant.

Of course, the entire panorama requires more than one fisheye, and each fisheye will have its own origin, O. Typically one will select the O closest to the tangent point, O'.

2. Analyzing images to find the k-polygons and e-polygons

The analysis is more difficult for natural environments. The analysis, which is individually optimized for each k-point, determines the three-dimensional environment in sufficient detail to accurately map k-projections from the k-point to viewpoints in its domain. The three-dimensional environment is specified by specifying the e-polygons and their corresponding k-polygons. Since the three-dimensional environment determines how the k-polygons move with the viewpoint, one can determine the e-polygons, which approximate this environment, by observing this motion.

In the preferred embodiment the analysis uses k-images, and one selects a target image for each reference image being analyzed. The target and reference images will be assumed to have the same orientation, and will be associated with nearby k-points. Normally, the nearby k-point will be an adjacent one; however, occlusion or other reasons may reduce the value of the adjacent k-points, forcing the use of other ones. In FIG. 4, 42 is a k-point adjacent to k-point 41, and 43 is a nearby k-point that is not adjacent to 41.

One then segments the reference image into (non-degenerate) polygons that are the projections of approximately planar areas in the environment. This segmentation can be done manually using human understanding of the environment. Alternatively, one can base it on a three-dimensional model of the environment, which could be built using a commercially-available three-dimensional modeling package. One would then have to consolidate polygons, as with CG environments above.

Each polygon in the reference image is registered with the target image, and the registration is fitted to a planar model. The following describes this analysis.

First we need to know how a point in the environment projects to the two k-points. In particular, we need to know how the two image points are related. The coordinate system has x and y in the image plane and z perpendicular to it. Then:

O=origin of the reference image; i.e., its k-point.

O'=origin of the target image

Figure 8:
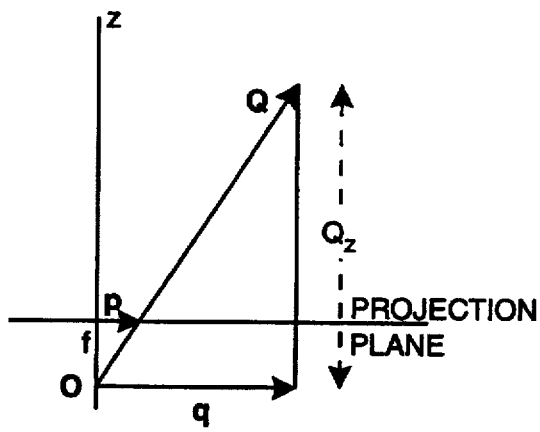
FIG. 8 illustrates the projection of an object point to a plane.

M=O'−O=the displacement between the k-points m=$(M_x, M_y, 0)$=components of M in the plane of projection Q=object point in the O coordinate system q=$(Q_x, Q_y, 0)$=components of Q in the plane of projection p=image point of Q in the reference image where boldface indicates a vector or point in two to three dimensions, and quantities with a prime refer to the target image. Then (see FIG. 8):

$$p f = q/Q_z$$  Eq. 5 and similarly $$p' f = q'/Q'_z$$  Eq. 6

Also, from the definition of M, it follows:

$$Q'=Q-M$$  Eq. 7

From these equations, it follows:

$$p'=p+(M_z p - fm)/(Q_z - M_z)$$  Eq. 8

It is useful to rewrite this as:

$$1/Q_z = (p'-p)/(M_z p' - p' - fm)$$  Eq. 9

The vector division in Eq. 9 implies that the numerator and denominator must be parallel, which is guaranteed by Eq. 8.

For Q in an e:polygon, which is assumed planar, we can write:

$$a Q_x + b Q_y + c Q_z = 1$$  Eq. 10

This equation explicitly constrains the constant term to be non-zero. When zero, the plane of the e-polygon passes through O, and the e-polygon projects as a line, or degenerate polygon, contradicting the segmentation. It follows that $1/Q_z$ is linear in p:

$$1/Q_z = a Q_x/Q_z + b Q_y/Q_z + c = a p_x/f + b p_y/f + c$$  Eq. 11 using Eq. 5. Combining Eq. 9 and Eq. 11:

$$a p_x/f + b p_y/f + c = (p'-p)/(M_z p' - fm)$$  Eq. 12

The next step is to determine p' as a function of p over the polygon. There are various ways of doing this. In the preferred embodiment, the polygon is broken into 8×8 blocks, and each block is compared with the target to find the best match; e.g., the minimum mean-square-difference. This is a well-known registration procedure in image coding and analysis. The possible values of p' are subject to epipolar constraints; in particular, the direction of p'-p is fixed by Eq. 8.

Eq. 12 is a system of linear equations in a, b, and c. If p' is known for at least four points in the polygon, this system is over-determined, and one can readily find the least-squares solution using standard techniques in linear algebra.

In the preferred embodiment, weighting is first applied to these points to reflect our confidence in them. One possibility is weight=<quality of fit>*<reliability of fit>

<quality of fit>=activity/(RMSE+noise)  Eq. 13

<reliability of fit>=<useful edge strength>

A quality fit has low RMSE (root-mean-square-error) relative to what is possible; for various reasons, one cannot expect a very low RMSE for a very "active" block, even with a very good vector. Activity measures the roughness of the block.

Furthermore, one cannot find a reliable fit for a block without any structure. If there is a strong edge, then the component of the vector p'-p normal to direction of the edge will be reliable, but the parallel component may not be. Since the direction of this vector is determined by the epipolar constraint (Eq. 8), the useful edge strength is the component of the edge direction normal to the constrained direction.

3. Extending the polygons

The polygon is then extended to support the viewpoints in its domain. This is done by:

finding imagery that is not visible at the k-point because of occlusion, but that is visible at some viewpoint in the domain;

finding a nearby k-point at which that imagery is visible; and mapping that imagery from said nearby k-point to said k-point.

In the preferred embodiment, one analyzes the relative motion of adjacent k-polygons by using Eq. 8 to examine pixels along their common border. If the polygons separate for any vector M, occlusion results, and the k-polygon corresponding to the more distant e-polygon must be extended. This can be done by mapping imagery to it from a k-point in the M direction. If that k-point does not have the occluded imagery, then it will be necessary to find a nearby k-point that does. The amount the k-point must be extended depends on the extent of the domain in the M direction. In some cases, an additional k-polygon must be created to support the occluded area.

In the embodiment that stores the polygons without extension, the extension is done dynamically as needed. This is the case when the k-projections are stored as k-images.

a) Mapping images to viewpoints

There are several steps in mapping an image at a viewpoint and orientation:

Select the appropriate k-point.

Translate the projections at that k-point to the viewpoint.

Rotate the orientations of the projections to the desired orientation.

Rotation and translation can be done be done in either order. If it is likely that the viewer will stay at one location for a while and look around, it is most efficient to translate first, to avoid repeating the translation. Otherwise, if the application supports stereographic images, rotation should probably be done first. The two stereographic images will have the same orientation but slightly different translations.

Of course, rotation and translation can be done at the same time.

The polygons are mapped in list-priority order, with the most distant one mapped first. Then the mapper needs not determine which pixels will actually, be displayed. Alternatively, the polygons could be mapped in reverse order, with the mapper taking care not to overwrite previously mapped pixels. The extra logic prevents any pixel from being mapped more than once.

This order is obviously only important when the polygons are combined into an image. If all of the polygons have the same orientation, it is desirable to combine then in the translation phase. Otherwise, they should be combined in the second phase.

i) K-projection selection

The domain of the k-point must contain the viewpoint. If domains overall;, the mapper will normally select the nearest one. However, if the mapper has adequate resources, it may map the image more than once and calculate a weighed average. This will reduce the discontinuity when the viewpoint moves between domains.

For the embodiment in which k-projections are k-images, it is likely that the domain of a k-image at a k-point will not cover the entire image at the viewpoint, and that k-images with different orientations will be required.

For the embodiment in which an e-polygon at a k-point is represented by multiple polygons at various orientations, the closest orientation will be preferable. However, the mapper can map more than once and average.

ii) Translation

Translation requires the use of polygons to achieve correct parallax. The mapping of any point, p, in a k-polygon to p' at the viewpoint is given by Eq. 8. M and m now refer to the displacement to the viewpoint, and $Q_z$ is given by Eq. 11.

When necessary to reduce computation, the mapper will first consolidate polygons into larger ones.

In the preferred embodiment, Eq. 8 and Eq. 11 are only used to translate the k-polygon's vertices to the viewpoint. Then for each pixel at that viewpoint, p', the corresponding source pixel, p, is found from the inverses of these equations:

$$p = p' - (M_x p' - fm)/(Q_z' + M_z) \qquad \text{Eq. 14}$$

$$1/Q_z' = a'p_x'/f + b'p_y'/f + c' \qquad \text{Eq. 15}$$

where:

$$a' = a/k \qquad \text{Eq. 16}$$

$$b' = b/k$$

$$c' = c/k$$

$$k = 1 - aM_x - bM_y - cM_z$$

iii) Rotation of orientation

If the orientation at a viewpoint changes, then the projection will change. This orientation change can be represented as a rotation of the coordinate system. As is well known, the corresponding change in the planar projection can be readily expressed in homogeneous coordinates (Foley, McMillan). If R is the rotation matrix that changes the coordinates of an object point Q to Q': Q'=R Q, then using Eq. 5:

$$(Q_x', Q_y', Q_z')^T = R(Q_x, Q_y, Q_z)^T = Q_z R(Q_x/Q_z, Q_y/Q_z, 1)^T = Q_z R(p_x/f, p_y/f, 1)^T$$

so that:

$$R(p_x/f, p_y/f, 1)^T = (Q_x', Q_y', Q_z')^T/Q_z = (Q_x'/Q_z, Q_y'/Q_z, 1)^T Q_z'/Q_z = (p_x'/f, p_y'/f, 1)^T w \qquad \text{Eq. 17}$$

where $w = Q_z'/Q_z$ is the third component of $R(p_x/f, p_y/f, 1)^T$.

Note this transformation is independent of the three-dimensional structure of the environment, since there is no parallax change. If all of the polygons have the same orientation and have been combined into an image, then the image can be transformed as a unit. Otherwise, the polygons must be rotated individually.

Rotations about an axis in the plane of projection is simpler. For example, for a rotation of ω about the y axis is:

$$p_x/f = ((p_x'/f) \cos ω + \sin ω)/D \qquad \text{Eq. 18}$$

$$p_y/f = (p_y'/f)/D$$

where $$D = -(p_x'/f) \sin ω + \cos ω$$

This can be done fairly fast if done column-wise: to find all of the pixels in the rotated projection for a column defined by fixed $p_x'$, first calculate D and $p_x$, using the above formulas. Then, for each pixel in that column, calculate $p_y$, which is a (non-integer) multiple of $p_y'$, and interpolate the value from the original projection at $(p_x', p_y)$. This is analogous to Chen's scanline coherence.

We claim:

1. A method for simulating movement within a multidimensional CG or natural environment by displaying an image at a specified viewpoint and orientation within said environment, where said viewpoint and orientation specify the location and direction of a point of view, the method comprising the steps of:

a) forming a database of the environment in a computer-readable storage medium by:
  i) determining a set of k-points in the environment, each k-point within said set having a domain within the environment and playback data associated therewith, said k-point domain forming a range of supported viewpoints and orientations, each of said k-points being defined as a center of projection;
  ii) projecting the environment onto a planar surface at a predetermined orientation to form a corresponding k-projection;
  iii) segmenting said corresponding k-projection into one or more k-polygons; and
  iv) for each said k-polygon, determining an e-polygon, said e-polygon being a planar polygon that approximates an area in the environment, said k-polygon being a projection of said area;
b) finding the k-point in the database whose domain supports the specified viewpoint and orientation;
c) mapping the k-projections at said k-point to said viewpoint and orientation to form said image; and
d) displaying said image.

2. The method of claim 1, wherein the step of projecting the environment includes:
  a) capturing a fisheye image with a camera having a fisheye lens;
  b) mapping said fisheye image to a sphere to form a mapped fisheye image; and
  c) projecting said mapped fisheye image onto a planar surface at a predetermined orientation to form a corresponding k-projection.

3. The method of claim 1, wherein the step of projecting the environment includes capturing said k-projection with a planar camera.

4. The method of claim 1, wherein the step of projecting the environment includes:
  a) capturing a planar projection with a planar camera; and
  b) rotating said planar projection to a predetermined orientation to form a corresponding k-projection.

5. The method of claim 1, further including manually determining k-polygons known to be projections of approximately planar areas in the environment, segmenting the k-projections into the determined k-polygons.

6. The method of claim 1, the e-polygons being based on a three-dimensional polygon-based model, wherein the segmentation step further includes:
  a) associating an e-polygon with a model polygon;
  b) consolidating the e-polygons when the resulting parallax error is lower than a predetermined limit;
  c) continuing said consolidation step at least until the number of consolidated e-polygons is reduced to a predetermined limit; and
  d) projecting the e-polygons onto a planar surface to form the corresponding k-polygons.

7. The method of claim 1, further including registering a k-polygon at one or more nearby k-points to determine the corresponding e-polygon.

8. The method of claim 1, wherein the k-polygons of a k-point are extended to support the domain of said k-point by:
  a) determining an occluded area in the environment that is visible at a viewpoint in said domain but occluded at said k-point;
  b) finding a nearby k-point containing said occluded area; and
  c) mapping said occluded area from said nearby k-point to said k-point.

9. The method of claim 1, wherein the mapping step further includes translating the k-polygons of a k-projection to the specified viewpoint.

10. The method of claim 9, further including consolidating the e-polygons and their corresponding k-polygons.

11. The method of claim 9, further including translating a second time to produce stereographic images.

12. The method of claim 1, wherein the mapping step further includes rotating the orientations of said k-polygons or k-projections to the specified orientation.

13. The method of claim 1, wherein the mapping step further includes translating the k-polygons to the specified viewpoint and rotating the orientations of said k-polygons or k-projections to the specified orientation.

14. The method of claim 1, further including compressing said k-polygons or said k-projections.

15. The method of claim 1, further including identifying the list-priority order of the k-polygons in said database.

16. The method of claim 1, wherein mapping further includes using nearby k-images to compensate for occlusion.

17. The method of claim 1, wherein the environment is projected to a non-planar surface, such as that of a cylinder.

18. The method of claim 1, wherein the segmentation is into curved areas.

19. The method of claim 1, wherein all information is determined from a CG model.

20. A method for constructing a 3-dimensional model of an environment consisting of the following steps:
  selecting a reference image having image pixels;
  selecting a target image having image pixels;
  manually segmenting the reference image into at least one polygon, said polygon being a projection of an area in the environment that is approximately planar;
  defining a planar model of said area;
  defining registration results as the relationship between image pixels in the reference image and those of the target image;
  registering the polygon in the reference image with the target image, determining said registration results; and
  fitting the registration results to the planar model.

21. The method of claim 20, wherein the registration step further includes applying an epipolar constraint.

22. The method of claim 20, wherein the registration step further includes:
  segmenting the polygons into a plurality of blocks; and
  separately registering the blocks.

23. The method of claim 22, further including:
  determining confidence weights for each of the blocks; and
  applying said confidence weights when fitting the registration results to the planar model.

* * * * *

UNITED STATES PATENT AND TRADEMARK OFFICE
CERTIFICATE OF CORRECTION

PATENT NO. : 5,694,531　　　　　　　　　　　　　　　　　　　　　　Page 1 of 1
DATED　　　: December 2, 1997
INVENTOR(S) : Golin et al.

It is certified that error appears in the above-identified patent and that said Letters Patent is hereby corrected as shown below:

Column 4,
Line 51, "view point" should read -- viewpoint --;

Column 6,
Line 33, "O," should read -- $O_S$, --;
Line 35, "h" should read -- $h_S$ --;
Line 66, "Φ" should read -- $\varphi, \varphi'$ --1

Column 8,
Line 8 (Eq. 9) "$1/Q_z = (p'-p)/(m_zp'-p'-fm)$" should read -- $1/Q_z = (p'-p)/(m_zp'-fm)$ --;
Line 11, "e: polygon" should read -- e-polygon --;
Line 20, "$1/Q$," should read -- $1/Q_z$ --;

Column 9,
Line 38, "actually, be" should read -- actually be --;
Line 45, "then" should read -- them --;
Line 50, "overall" should read -- overlap --;

Column 10,
Line 46, "co" should read -- ω --.

Signed and Sealed this

Fourth Day of December, 2001

Attest:

NICHOLAS P. GODICI
*Attesting Officer*　　　*Acting Director of the United States Patent and Trademark Office*